(12) United States Patent
Waugh et al.

(10) Patent No.: US 10,075,425 B1
(45) Date of Patent: Sep. 11, 2018

(54) VERIFIABLE LOG SERVICE

(71) Applicant: Amazon Technologies, Inc., Seattle, WA (US)

(72) Inventors: Robert Mark Waugh, Seattle, WA (US); Daniel Vassallo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 15/249,136

(22) Filed: Aug. 26, 2016

(51) Int. Cl.
*H04L 9/32* (2006.01)
*H04L 29/06* (2006.01)

(52) U.S. Cl.
CPC ........ *H04L 63/0815* (2013.01); *H04L 9/3242* (2013.01); *H04L 9/3297* (2013.01)

(58) Field of Classification Search
CPC ................. H04L 9/3294; H04L 9/3281; H04L 29/08072; H04L 63/123; H04L 9/3223; G06F 21/10
See application file for complete search history.

(56) References Cited

U.S. PATENT DOCUMENTS

| | | | | |
|---|---|---|---|---|
| 8,005,941 B2* | 8/2011 | Kruse | ..................... | H04L 29/06 709/203 |
| 8,892,518 B1* | 11/2014 | Kannan | ............... | G06F 11/0709 707/631 |
| 9,298,914 B1* | 3/2016 | McCorkendale | ..... | G06F 21/552 |
| 2014/0298034 A1* | 10/2014 | Watanabe | ............. | H04L 9/3236 713/176 |
| 2016/0328298 A1* | 11/2016 | Resch | ................. | G06F 11/1076 |

OTHER PUBLICATIONS

Dang, Q., "Recommendation for Applications Using Approved Hash Algorithms" NIST Special Publication 800-107, Revision 1, National Institute of Standards and Technology (NIST), Aug. 2010, retrieved Nov. 24, 2015, from http://csrc.nist.gov/publications/nistpubs/800-107-rev1/sp800-107-rev1.pdf, 25 pages.

* cited by examiner

*Primary Examiner* — Ali S Abyaneh
(74) *Attorney, Agent, or Firm* — Davis Wright Tremaine LLP

(57) ABSTRACT

A logging service maintains an interdependent series of hash values for log entries submitted to the logging service by one or more clients. The logging service generates a hash value for each log entry based at least in part on the content of the log entry and a hash value of one or more previous log entries. The generated hash values are saved in an audit database by the clients. Clients may retain some, all, or none of the hash values based at least in part on the amount of auditing desired and the amount of storage space available in the audit database. The clients are able to verify the integrity of log entries submitted to the logging service retrieving the log entries from the logging service, recalculating the hash values, and comparing the recalculated hash values to the hash values in the audit database.

18 Claims, 12 Drawing Sheets

VERIFIABLE LOG SERVICE

BACKGROUND

Remote services are becoming an increasingly important part of customer IT systems. By using remote services, customers may be able to reduce costs, limit internal complexity, and provide scalability for their applications. Various customer applications may utilize dynamically-provisioned virtual computing resources, online storage services, cryptography services, key management services, and log services. Many customer applications process business-sensitive information and therefore many customers wish to closely monitor the operation of any remote services on which their critical applications rely. One way that the operation of the customer application may be monitored is via the analysis of log files. If the log files themselves are maintained by a remote service, the customer may have difficulty ensuring that the logs have not been tampered with or corrupted.

BRIEF DESCRIPTION OF THE DRAWINGS

Various techniques will be described with reference to the drawings, in which.

DETAILED DESCRIPTION

Figure 1:
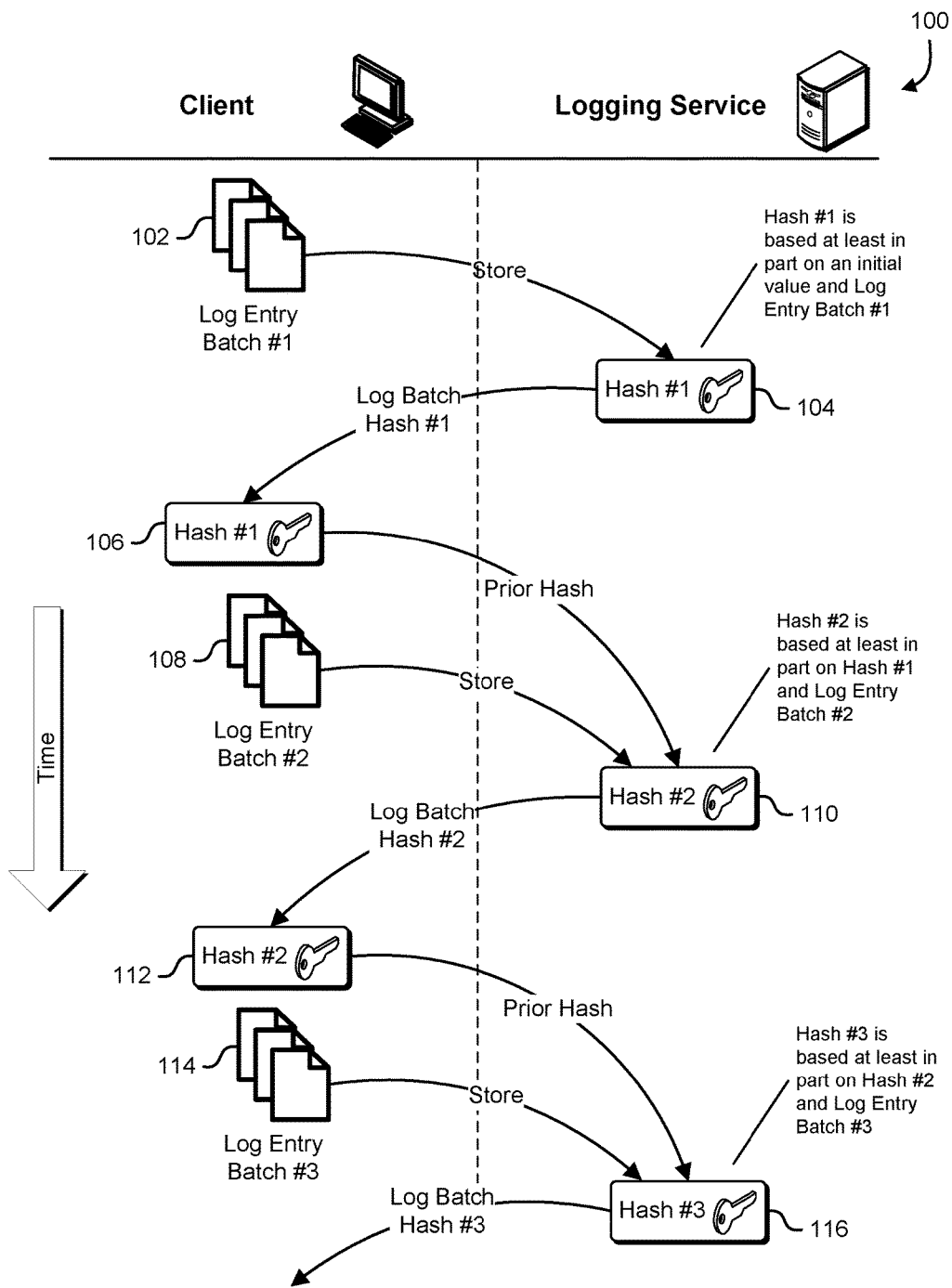
FIG. 1 shows an illustrative example of an environment in which various embodiments may be practiced.

The current document describes a system that provides a tamper-resistant logging service using a mechanism that allows clients to verify that the log entries maintained by the logging service have not been altered. When a client submits a sequence of log entries to the logging service, the logging service generates an interdependent series of hash values which may be provided to the client. When the logging service receives a sequence of log entries from the client, the logging service assigns a sequence ID to each log entry of the received log entries and determines an initial hash value. The logging service may determine an initial hash value by retrieving a previous hash value generated from previous log entries or by using a random initial hash value if no previous log entries have been received. A hash value for the first log entry in the received sequence is generated using the initial hash value and the content of the first log entry. The logging service generates hash values for each of the remaining log entries by generating a hash value based at least in part on the content of each log entry, combined with the hash of the previous log entry. The logging system returns the range of sequence IDs and the hash of the last log entry in the sequence to the client.

As a result of receiving the range of sequence ID's and the hash of the last log entry, the client may elect to save the information in an audit history database. The client may selectively verify the log entries maintained by the logging service using the information stored in the audit history database. By verifying the log entries against the information stored in the audit history database, the client may detect unauthorized modification or tampering. The client may retain some, all, or none of the audit-history information based at least in part on the amount of auditing desired and the amount of storage space available for the audit-history information.

The client may initiate an audit of the log entries maintained by the logging service by submitting, to the logging service, a request that identifies a range of sequence IDs. The logging service responds to the request by providing the log entries associated with the range of sequence IDs. The client retrieves, from the audit history database, the initial and final hash values for the specified range of log entries. In some examples, the logging system provides the initial hash value to the client in response to the audit request. The client uses the initial hash value and the content of the returned log entries to regenerate the hash values of the returned log entries. The client confirms that the regenerated hash value of the last log entry in the sequence of log entries matches the final hash value stored in the audit history database. If the regenerated hash value does not match the hash value retrieved from the audit history database, the logs may have been modified or corrupted. In some examples, the logging service returns hash values for each log entry, and the client may validate the regenerated hash of each log entry against a corresponding hash value supplied by the logging service.

When determining the hash values for the log entries, the log entries are processed in accordance with the sequence numbers assigned to each log entry by the logging service. In general, the hash value of the current log entry is based at least in part on the hash value of at least one previous log entry. In some examples, the prior hash value is provided to a hash-value-generation function as a seed value. In other examples, the hash value of the previous log entry is combined with the data of the current log entry. For example, the prior hash value may be prepended or appended to the data of the current log entry, and the hash value determined for the entire combination. For example, the hash value of the first log entry is combined with the data of the second log entry, and the hash value of the combination is the hash value of the second log entry. The hash value of the second log entry is combined with the data of the third log entry and so on.

In some implementations, clients submit log entries to the logging service in batches. The logging service assigns sequence numbers to the log entries within each batch, and determines a hash value for each log entry within the batch. The hash value of the log-entry batch is the hash value of the last log entry in the batch. In response to receiving a batch of log entries, the logging service returns the hash value of the batch to the client. In some examples, the logging service determines the hash value of the batch by combining the hash value of the previous batch with each log entry in the log batch provided by the client. The hash value of each log entry is based at least in part on the content of each log entry and the hash value of the previous batch. The hash values of each log entry in the batch are combined to produce a hash value for the batch.

The logging service may be implemented using a plurality of servers or a server cluster. In such examples, log entries within a log-entry batch may be processed by different servers of the logging service, making the sequencing of log entries within a log-entry batch more difficult. The hash values of the log entries within a particular log-entry batch may be combined using a commutative function such as an addition, multiplication, or exclusive OR ("XOR") function. If a commutative function is used to combine the hash values of log entries, log entries within a batch may be processed in various orders while producing matching batch hash values.

FIG. 1 shows an illustrative example of an environment in which various embodiments may be practiced. A timeline 100 shows a sequence of interactions between a client and a logging service. The client submits 102 a first log-entry batch to the logging service.

As a result of receiving the first log-entry batch, the logging service assigns a sequence number to each log entry within the first log-entry batch, and determines a hash value for each log entry in the first log-entry batch in the order of the assigned sequence numbers. The hash value of the first log entry is based at least in part on the content of the first log entry and a seed value. In some examples, the seed value is zero. In other examples, the seed value is configured by an administrator of the logging service. The hash value of each of the remaining log entries is based at least in part on the hash value of a previous log entry. The logging service retains the log entries in association with the hash values and assigned sequence numbers. In some examples, the hash value of the log-entry batch is a hash value of the last log entry in the log-entry batch. In another example, the hash value of the log-entry batch is determined by combining the hash values of each log entry in the log-entry batch. The hash values of a log-entry batch may be combined using a commutative function, producing a combined hash value that is tolerant to reordering of log entries within the log-entry batch. In other examples, hash values of a log-entry batch are combined with a non-commutative function so that the order of log entries within the log-entry batch may be adjusted without changing the hash value of the batch.

In one example, the hash value for a log-entry batch is determined by determining, in a particular sequence that is dependent on the sequence number of each log entry in the log-entry batch, a hash value for each log entry in the log-entry batch. The hash value of each log entry in a log-entry batch is determined by prepending the hash value of the log entry previous to the log entry to the data of the log entry, and determining a cryptographic hash of the combined hash value and data. The hash value of the last log entry in the log-entry batch is used as the hash value of the log-entry batch.

In another example, the hash value for a log-entry batch is determined by determining a hash value for each log entry in the log-entry batch, and combining the resulting hash values into a single hash value for the log-entry batch. The hash value of each log entry in a log-entry batch is determined by determining a cryptographic hash of the data associated with the log entry. The hash values of the log entries in the log-entry batch are combined to produce a hash value for the log-entry batch. The hash values of the log entries may be combined using a commutative function such as addition or a logical exclusive or operation. If a commutative function is used to combine the hash values, log entries within a log-entry batch may be processed in any order to generate the same log-entry batch hash value. In some implementations, the hash value of each log entry is determined using a non-invertible function, a one-way function, or a function for which producing an output from input data is relatively easy, but identifying data to produce a particular output is relatively difficult.

The logging service returns information to the client that allows the client to verify the integrity of the logging service. In some examples, the logging service returns 104 the hash value of the first log-entry batch to the client. In another example, the logging service returns 104 the hash value of first log-entry batch, and a range of sequence numbers assigned to the first log-entry batch.

The client receives 106 the hash value for the first log-entry batch, and determines whether to store the hash value in an audit database. In some examples, the client retains all of the hash values in the audit database. In other examples, the client selectively retains hash values in the audit database to conserve storage space. In yet another example, the client retains hash values randomly, making it difficult for the logging service to predict which log entries will be audited by the client at a later time. The client provides 108 a second log-entry batch and the hash value of the first log-entry batch to the logging service.

The logging service receives the second log-entry batch, and uses the hash value of the first log-entry batch and the content of the log entries in the second log-entry batch to determine a hash value for the second log-entry batch. The logging service retains the log entries of the second log-entry batch, and provides 110 the determined hash value of the second log-entry batch to the client.

The process of submitting additional log-entry batches to the logging service continues with the client submitting 112 the hash value of the second log-entry batch and a third log-entry batch 114 to the logging service. The logging service uses the content of the third log-entry batch 114 and the hash value of the second log-entry batch to determine a hash value for the third log-entry batch. The hash value of the third log-entry batch is provided 116 to the client.

If the client determines that a particular batch of log entries is to be audited, the client requests log entries associated with a particular batch from the logging service. The log entries may be requested using sequence numbers assigned by the logging service and provided to the client. In response to the request, the logging service provides the log entries to the client. The client acquires the hash value of the previous batch of log entries. In some examples, the hash value of the previous batch of blog entries is maintained in the audit history database. In other examples, the hash value of the previous batch of log entries is provided by the logging service with the log entries to be audited. The client recalculates the hash value of the batch of log entries to be audited, and compares the recalculated hash value to a hash value retained in the audit history database. If the hash value in the audit history database matches the recalculated hash value, the client may be reasonably certain that the log entries have not been modified. If the hash value in the audit history database does not match the recalculated hash value, the integrity of the log entries has been compromised.

Figure 2:
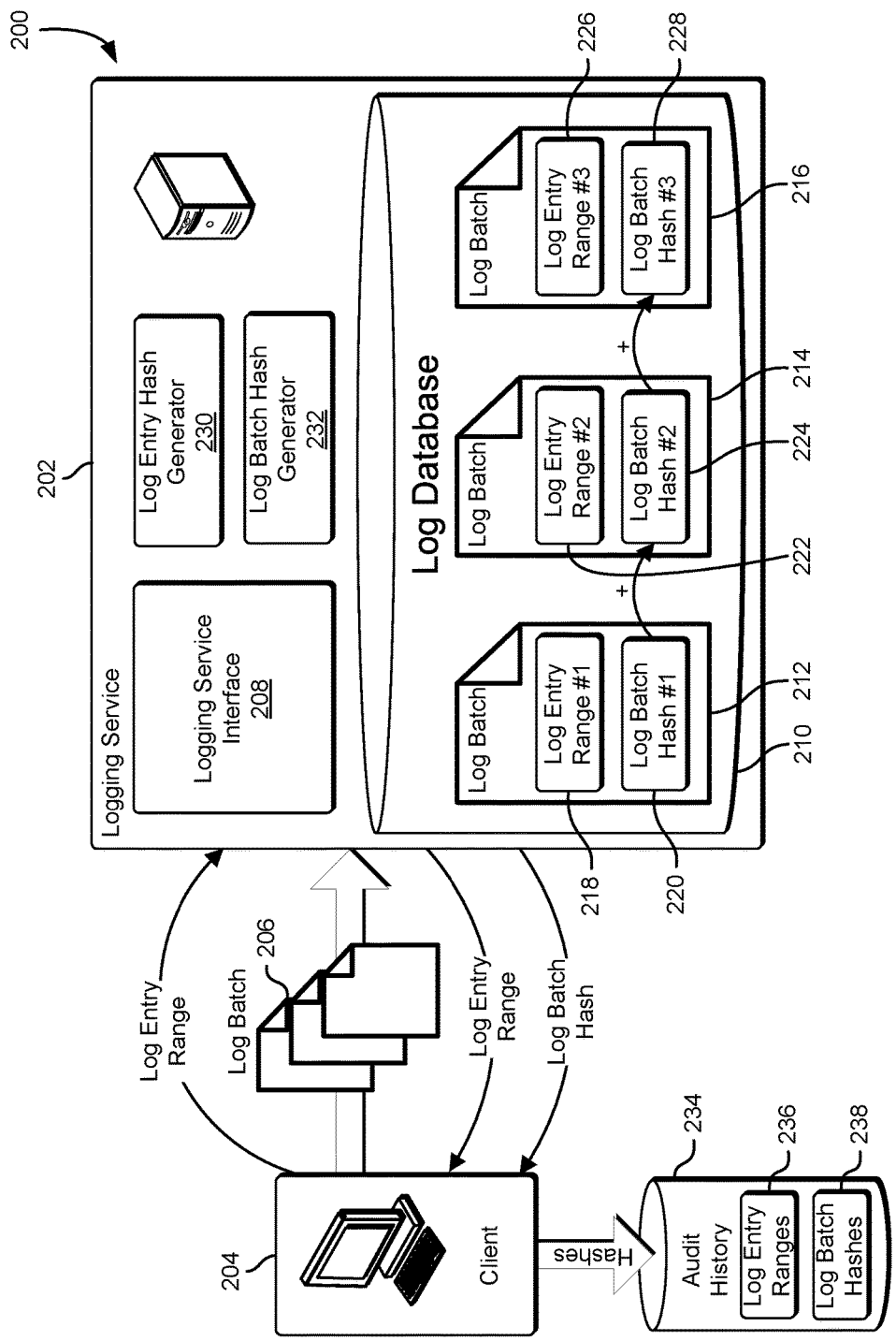
FIG. 2 shows an illustrative example of a logging service that receives a batch of log entries from a client and, in response, provides a hash value and range for the batch of log entries.

FIG. 2 shows an illustrative example of a logging service that receives a batch of log entries from a client and, in response, provides a hash value and range for the batch of log entries. A system diagram 200 shows a logging service 202 that is used by a client computer system 204. The client computer system 204 submits a log batch 206 to the logging service 202 via a logging-service interface 208. The logging-service interface 208 may be an application programming interface ("API"), a web-service interface, a remote procedure call ("RPC") interface, a local procedure call, or other interface accessible to the client computer system 204. In response to receiving the log batch 206 from the client computer system 204, the logging service 202 returns a log entry range and a log batch hash for the log batch 206. The log entry range specifies a range of identifiers that are assigned by the logging service 202 to the entries of the log batch 206. The log batch hash is a hash value for the log batch 206. In some examples, the logging service 202 also returns a prior hash value to the client computer system 204.

The logging service 202 maintains a log database 210 that retains log batches submitted by the client computer system 204. The log database 210 retains a number of log entries that are arranged in batches. In the example shown in FIG. 2, the log database 210 includes a first log batch 212, a second log batch 214, and a third log batch 216. Each log batch includes a sequence of log entries as well as an associated log-entry range and a log-batch hash. The first log batch 212 has a first log-entry range 218 and a first log-batch hash 220. The second log batch 214 has a second log-entry range 222 and a second log-batch hash 224. The third log batch 216 has a third log-entry range 226 and a third log-batch hash 228. The log-entry range of each log batch identifies a range of sequence identifiers associated with the log entries that are part of the log batch. The log batch hash of each log batch is the hash associated with the log batch. A log batch hash depends on the log entries of the log batch associated with the log batch hash as well as the log batch hash of the previous log batch. The log database 210 maintains an ordering of log batches.

The log database 210 may be implemented using a relational database server, a file system, a block-addressable memory, or other data storage structure. In one implementation, the log database 210 retains log entries as files in a file system, and log batches are maintained in separate directories on the file system. In another implementation, log entries are maintained as entries in a data table on a relational database server, and batch identifiers and sequence numbers are retained as elements of each entry. In yet another implementation, log entries are maintained in memory and are stored in a linked list in association with and in a sequence defined by the sequence numbers assigned by the logging service 202.

The logging service 202 includes a log entry hash generator 230 and a log batch hash generator 232. The log entry hash generator 230 generates hash values for individual log entries. A hash value may be used as an indicator of data integrity, as changes to a data set are likely to change an associated hash value of the data set. Other indicators of data integrity may be used in place of hash values. In many examples, the indicator of data integrity is a cryptographic hash value of the data set, but alternative indicators of data integrity may be generated for individual log entries using a cryptographic hash function, one-way function, cyclic redundancy code ("CRC"), checksum, or non-invertible function. In various examples, the logging service uses CRC-32, SHA-256, MD5, SHA-1, or HMAC functions to generate an indicator of data integrity. In the present document, a hash value may refer to a cryptographic hash, or other indicator of data integrity. In various examples, the use of a strong cryptographic hash makes it difficult for an attacker to fabricate false log entry data that matches the generated hash values. The log batch hash generator 232 generates hash values for individual log batches. In some examples, the log batch hash generator 232 uses a cryptographic hash, one-way function, or non-invertible function to generate hash values. In another example, the log batch hash generator 232 uses a commutative function such as addition, multiplication, or a logical XOR operation to combine the hash values of log entries within a log batch to produce a log batch hash.

Information returned to the client computer system 204 by the logging service 202 is retained by the client computer system 204 in an audit history database 234. The audit history database 234 retains log entry ranges 236 in association with corresponding log batch hashes 238. The information allows the client computer system 204 to verify that the log entries maintained by the logging service 202 have not been altered. In some examples, the client computer system 204 retrieves log entries from the logging service 202 for verification, determines the hash values associated with the log entries, and compares the determined hash values to the stored hash values in the audit history database 234. In another example, the client computer system 204 requests, from the logging service 202, hash values for the currently stored log entries, and compares the hash values provided by the logging service 202 to the hash values retained in the audit history database 234.

The client computer system 204 may selectively store information in the audit history database 234. In some examples, the client computer system 204 retains a fixed ratio of the log entry range/log batch hash pairs returned by the logging service 202 (for example, every third, fourth, or fifth pair). In another example, the client computer system 204 retains a fixed percentage of the log entry range/log batch hash pairs by randomly selecting pairs for retention according to fixed odds. In yet another example, the client computer system 204, in response to decreasing available storage resources, combines currently retained log entry range/log batch hash pairs into a smaller number of pairs. In yet another example, the client computer system 204, in response to decreasing available storage resources, discards log entry range/log batch hash pairs that are older than a threshold amount of time.

Figure 3:
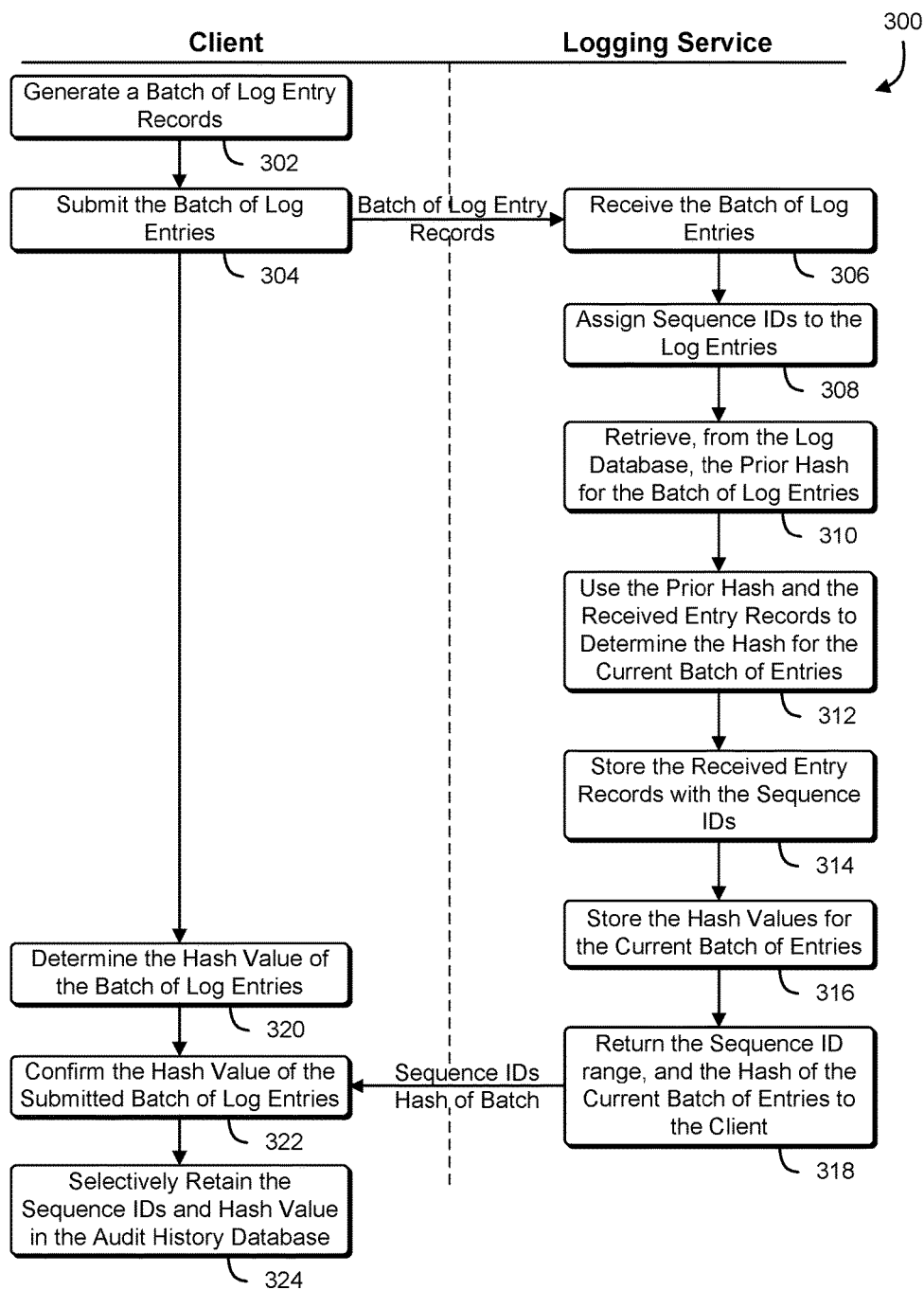
FIG. 3 shows an illustrative example of a process that, as a result of being performed by a client and a logging service, determines a hash value for a batch of log entries provided by the client to the logging service, and provides the determined hash value to the client.

FIG. 3 shows an illustrative example of a process that, as a result of being performed by a client and a logging service, determines a hash value for a batch of log entries provided by the client to the logging service, and provides the determined hash value to the client. A swim diagram 300 illustrates a process that begins at block 302 with a client generating a batch of log entry records. The log entries may be generated by an application, a service, or other system monitored by the client. The client collects the log entry records into a single batch of log entries, and submits 304 the batch of log entries to the logging service.

At block 306, the logging service receives the batch of log entry records from the client. The logging service assigns 308 sequence identifiers to each of the log entry records in the batch to define an ordering for the log entry records within the batch, and also to record the order of the log entry records with respect to log entry records previously received. The sequence identifiers may be numerical identifiers, alphanumerical identifiers, alphabetic identifiers, or other identifier capable identifying an ordering for the log entry records. The logging service queries the log database to identify the last batch of log entries stored by the logging service, and retrieves 310 the hash value of the identified batch. The hash value of the previous batch of log entry records is referred to as the prior hash of the current batch of log entry records.

At block 312, the logging service uses the hash value of the prior batch and the data of the log entry records to determine a hash value for each log entry record in the current batch. In some examples, the log entry records are processed in the order of their assigned sequence identifiers. The hash value of each log entry is determined by combining the hash value of the previous log entry with the data of the current log entry, and determining a cryptographic hash for the combination. The hash value may be combined with the data by prepending the hash value to the data, appending the hash value to the data, or by using the hash value as a seed value when determining a cryptographic hash.

In another example, the log entry records may be processed in more than one different order. The hash value for each log entry is determined by determining a cryptographic hash value for the data associated with each log entry. The hash values of the log entries for a given batch are combined using a commutative function such as addition, multiplication, or a logical exclusive OR function, to produce a hash value for the given batch. The use of a commutative function allows the hash values to be combined in different orders and still produce the same hash value.

The logging service stores 314 the log entry records to the log database in association with the sequence identifiers assigned to the log entry records. At block 316, the logging service stores the hash values determined for the current batch of log entries. In some examples, the logging service stores the hash of each log entry in association with the log entry. In another example, the logging service stores the hash value of the batch in association with each log entry in the batch. The logging service returns 318 the range of sequence IDs assigned to the batch and the hash value determined for the batch to the client.

At block 320, the client determines a hash value for the batch of log entries using the log entries submitted to the logging service, and the prior hash value of the previous batch of log entries. The hash value is determined using a method that matches the method used by the logging service. At block 322, the client receives the range of sequence identifiers and the hash value of the batch of log entry records from the logging service, and confirms that the hash value received from the logging service matches the hash value determined by the client. If the hash value received from the logging service does not match the hash value determined by the client, the client determines that the log entries submitted by the client may have been modified or corrupted by the logging service. In some examples, the client selectively or randomly confirms the hash value provided by the logging service against a hash value determined by the client to reduce the amount of processing performed by the client. The client selectively retains 324 the information provided by the logging service in an audit history database. In determining whether the client retains the information in the audit history database, the client may consider the amount of available storage space in the audit history database, the rate at which log entries are being submitted to the logging service, the trustworthiness of the logging service, and the average number of log entries in each batch submitted to the logging service. In some examples, the client deletes low priority information from the audit history database before storing the information provided by the logging service. In some examples, low priority information is identified based at least in part on the age of the information. In another example, low priority information is identified based at least in part on the number of log entries in a recorded batch. In yet another example, a batch is randomly selected from the audit history database, verified by the client, and then deleted to make room for the new audit history information.

Figure 4:
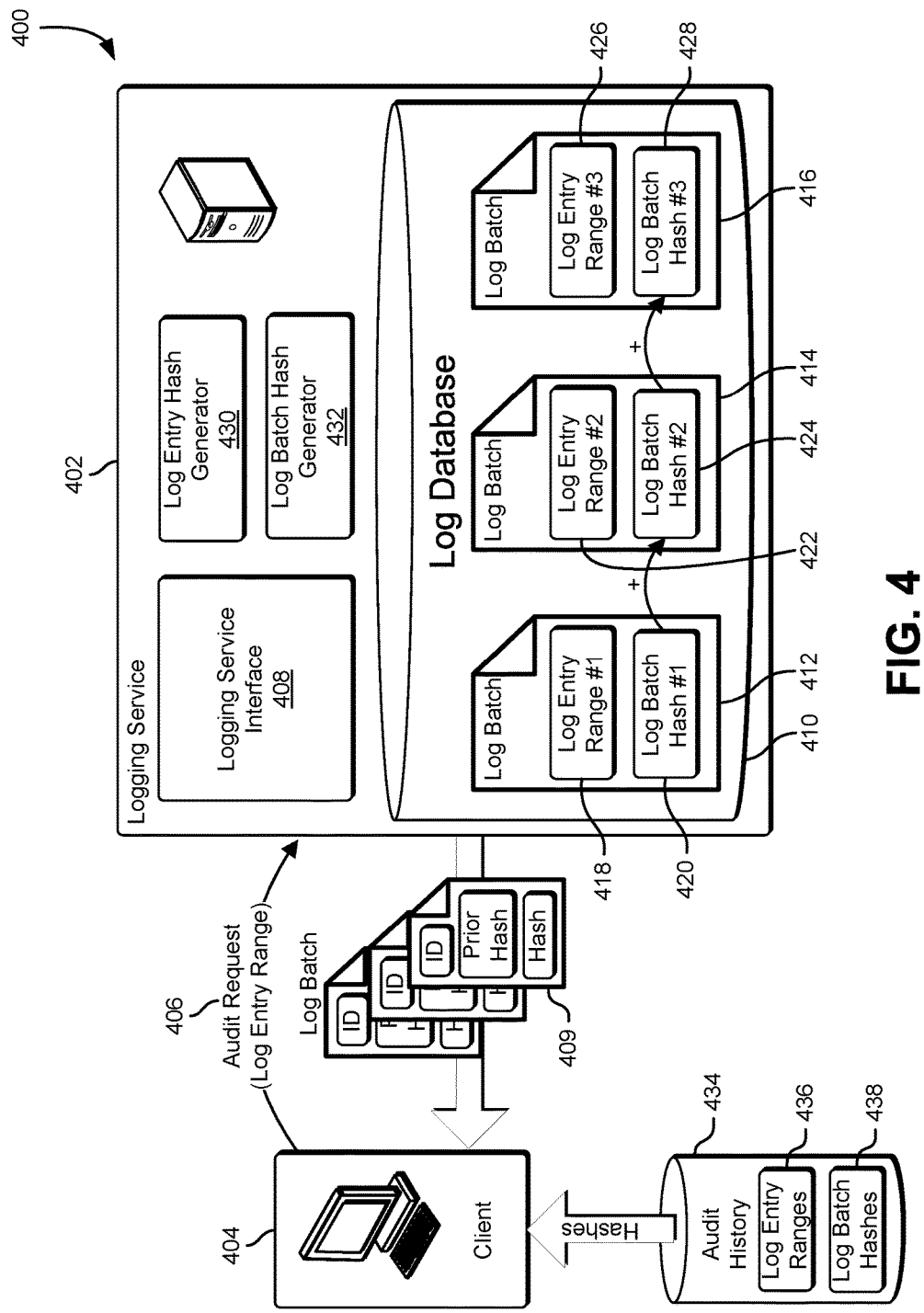
FIG. 4 shows an illustrative example of a client that retrieves a batch of log entries from a logging service and verifies the integrity of the log entries using information maintained in an audit history database.

FIG. 4 shows an illustrative example of a client that retrieves a batch of log entries from a logging service and verifies the integrity of the log entries using information maintained in an audit history database. A system diagram 400 shows a logging service 402 that is used by a client computer system 404. The client computer system 404 submits an audit request 406 to the logging service 402 via a logging-service interface 408. The audit request 406 specifies a range of identifiers associated with the log entries to be audited. In response to the audit request 406, logging service 402 returns a log batch 409 corresponding to the range of identifiers provided by the client computer system 404. The log batch 409 includes a set of log entry records. Each log entry record in the set of log entry records includes an associated identifier for the log entry record, the hash value for the log entry record, and a prior hash value. In some implementations, the prior hash value is identified by a reference to a previous log entry record. In another implementation, the hash value for the log entry record and the prior hash value are omitted from the log batch 409, and are instead retrieved from the audit history database 434.

The logging service 402 maintains a log database 410 that retains log batches submitted by the client computer system 404. The log database 410 retains log entries which are arranged in a sequence of batches. In the example shown in FIG. 4, the log database 410 includes a first log batch 412, a second log batch 414, and a third log batch 416. Each log batch includes a sequence of log entries as well as an associated log-entry range and a log-batch hash. The first log batch 412 has a first log-entry range 418 and a first log-batch hash 420. The second log batch 414 has a second log-entry range 422 and a second log-batch hash 424. The third log batch 416 has a third log-entry range 426 and a third log-batch hash 428. The log-entry range of each log batch identifies a range of sequence identifiers associated with the log entries that are part of the log batch. The log batch hash of each log batch is the hash associated with the log batch. The log database 410 maintains an ordering of log batches. A log batch hash depends on the log entries of the log batch associated with the log batch hash as well as the log batch hash of the previous log batch.

The logging service 402 includes a log entry hash generator 430 and a log batch hash generator 432. The log entry hash generator 430 generates hash values for individual log entries. The log batch hash generator 432 generates hash values for individual log batches.

As a result of receiving the audit request 406 from the client computer system 404, the logging service 402 queries the log database 410 and retrieves the log entries identified by the audit request 406. In some examples, the audit request 406 identifies a particular log batch by specifying a range of identifiers associated with the log entries within the particular batch. In another example, the audit request 406 identifies a particular log batch by specifying at least one identifier associated with a log entry within the particular batch. The logging service 402 returns the requested log batch to the client computer system 404, each log entry record in the requested log batch including an identifier for the log entry record and the hash value for the log entry record. In some examples, the logging service 402 provides a prior hash value for each log entry record in the requested log batch.

The client computer system 404 uses the log batch 409 returned by the logging service 402 to verify that the log entry records associated with the log batch 409 have not been modified or corrupted. The client computer system 404 queries an audit history database 434 to acquire an expected hash value for the log batch 409. The audit history database 434 retains log batch hashes 438 in association with log entry ranges 436. The client computer system 404 determines the range of identifiers represented in the log batch 409 and queries the audit history database 434 to retrieve the expected hash values for the log entry records in the log batch 409. The client computer system 404 recalculates the hash value of each log entry record in the log batch 409 using the log entry record data and prior hash value provided by the logging service 402. In some examples, the prior hash value for each batch of log entry records is retained in the audit history database 434, and the client computer system 404 determines the prior hash for each log entry record by determining the hash value of each log entry record in sequence. If the hash values determined by the client computer system 404 match the hash values provided by the logging service 402, then it is likely that the corresponding log entry records retained by the logging service 402 have not been altered or corrupted. If the hash values determined by the client computer system 404 do not match the hash values provided by the logging service 402, then the log entry records retained by the logging service 402 have been altered since they were submitted by the client computer system 404.

Figure 5:
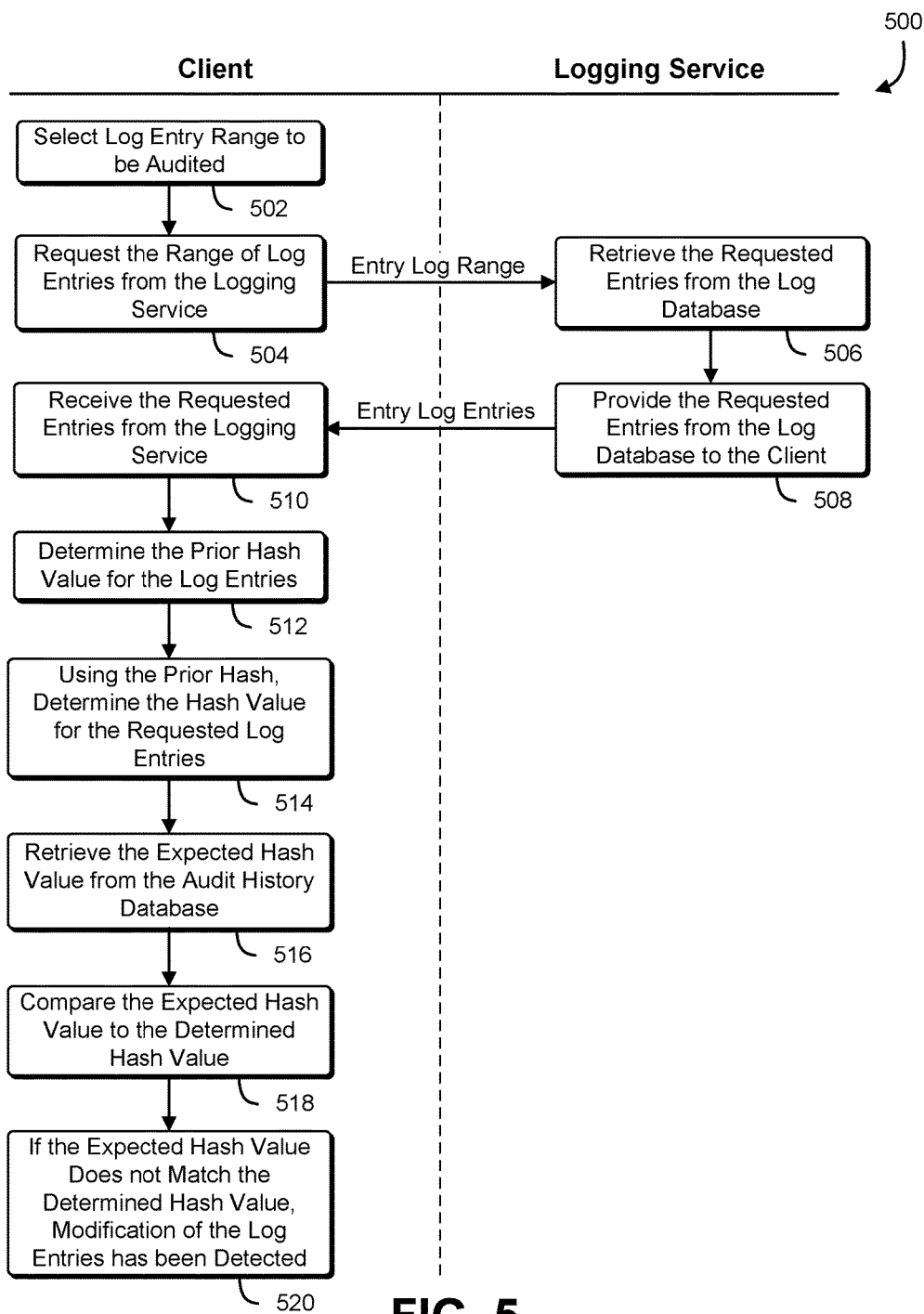
FIG. 5 shows an illustrative example of a process that, as a result of being performed by a client and a logging service, verifies the integrity of a batch of log entries based at least in part on information maintained in an audit history database.

FIG. 5 shows an illustrative example of a process that, as a result of being performed by a client and a logging service, verifies the integrity of a batch of log entries based at least in part on information maintained in an audit history database. A swim diagram 500 illustrates a process that begins at block 502 with a client selecting a log entry range to be audited. The client selects a log entry range by selecting, from an audit history database, audit information that allows the log entry range to be verified. The audit information includes hash values for range of log entry records. In some examples, the client selects the oldest audit information in the audit history database. In another example, the client randomly selects audit information from the audit history database. In some implementations, once the client has extracted the audit information from the audit history database, the client deletes the audit information from the audit history database. The client identifies a range of log entry records based at least in part on the audit information, and requests 504 the range of log entry records from the logging service.

The logging service receives the request from the client, and retrieves 506 the requested log entry records from a log database maintained by the logging service. The logging service provides 508 the requested log entry records to the client. In some examples, the logging service also provides hash values for the requested log entry records. In additional examples, the logging service provides prior hash values for the requested log entry records.

The client receives 510 the requested log entry records from the logging service. At block 512, the client determines a prior hash value for the requested log entry records. In some examples, the prior hash value for the requested log entry records is provided by the logging service. In other examples, the client queries the audit history database and retrieves the hash value associated with a log entry record immediately preceding the requested log entry records. Using the prior hash value, the client determines 514 a hash value for each log entry record in the requested log entry records. In some examples, the hash value of each log entry record is determined by combining the hash value of the immediately preceding log entry record with the data of the log entry record, and determining a cryptographic hash of the combination.

The client retrieves 516 expected hash values for the requested log entry records from an audit history database maintained by the client. The expected hash values are compared 518 to the hash values determined by the client. The block 520, the client determines whether the requested log entry records have been modified since they were originally submitted to the logging service. If the expected hash value of each requested log entry matches the corresponding hash value determined by the client, the client determines that the requested log entry records have not been modified since they were submitted to the logging service. If the expected hash value of any requested log entry does not match the corresponding hash value determined by the client, the client determines that the requested log entry records have been modified or corrupted since they were submitted to the logging service.

Figure 6:
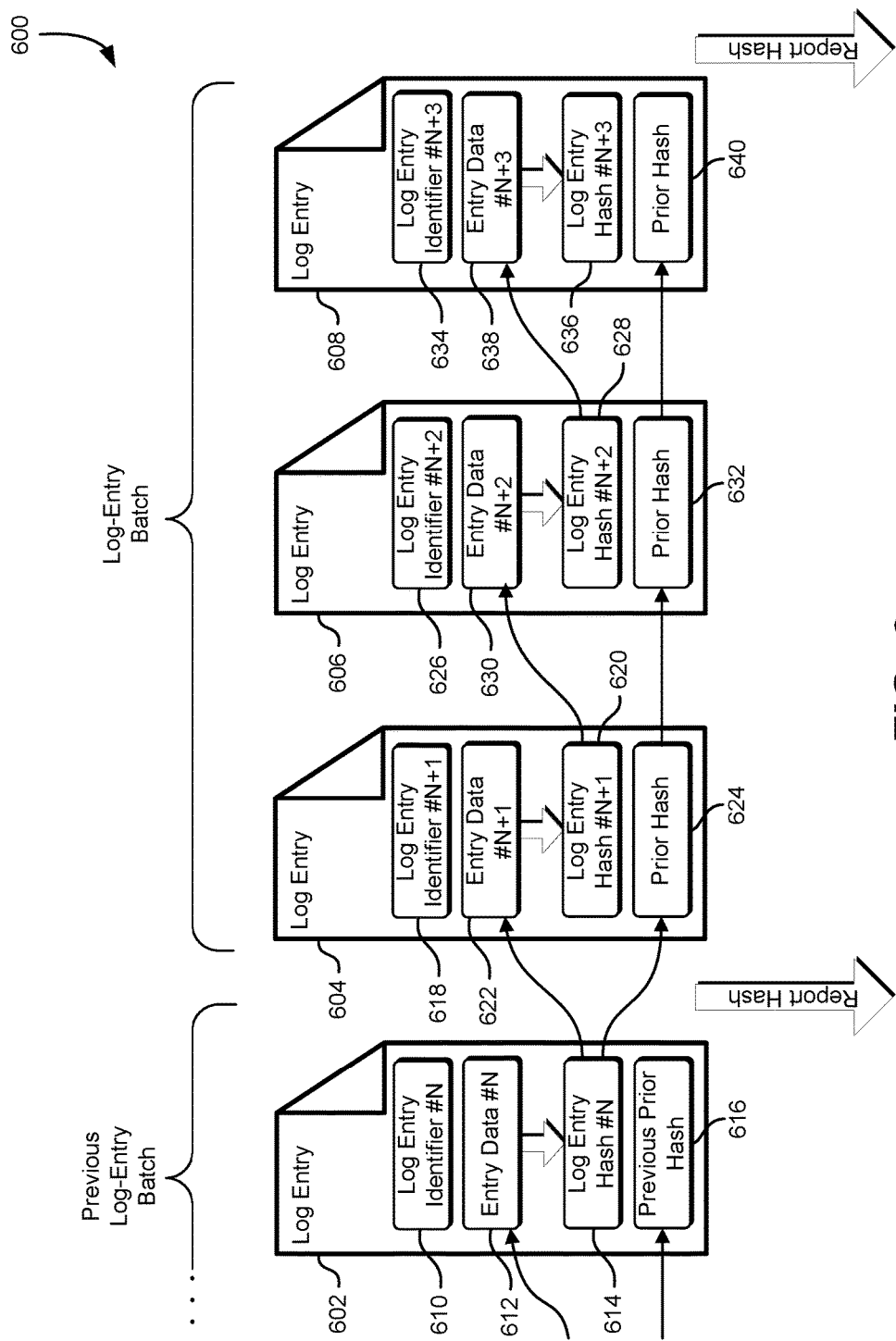
FIG. 6 shows an illustrative example of a log-entry-batch structure used by a logging service that includes information that allows a client to verify the integrity of the log-entry content.

FIG. 6 shows an illustrative example of a log-entry batch structure used by a logging service that includes information that allows a client to verify the integrity of the log-entry content. A data diagram 600 shows a number of log entry records that are received and processed by a logging service. An initial log entry record 602 is associated with a previous log-entry batch. A first log entry record 604, a second log entry record 606, and a third log entry record 608, are associated with a current log-entry batch.

When a new log entry is received by the logging service, the logging service assigns a log entry identifier to the new log entry. The log entry identifier is a comparable value that defines an ordering for the log entry records. The log entry identifier is based at least in part on the log entry identifier assigned to the previous log entry. In many examples, the log entry identifier is a sequence number, and each subsequent log entry record receives the next log entry identifier in the sequence. The initial log entry record 602 is assigned an initial log entry identifier 610.

Each log entry record received by the logging service includes entry data associated with the log entry record. As a result of receiving a log entry record, the logging service determines a log entry hash value for the log entry record based at least in part on the entry data of the log entry record, and a previous hash value associated with a previous log entry. In the example shown in FIG. 6, an initial log entry hash 614 for the initial log entry record 602 is determined by combining initial entry data 612 with a hash value of the previous log entry record, and generating a cryptographic hash of the combination. If there is no previous log entry record, a value of zero or a randomly generated seed value may be used as a substitute for the hash value of the previous log entry record. If a substitute hash value is used by the logging service, the substitute hash value is stored in the log database.

Each log entry record that belongs to a particular log-entry batch includes a prior hash value. The prior hash value is the hash value associated with the immediately previous log-entry batch. In some examples, the prior hash value is the hash value of the log entry record immediately preceding the current log-entry batch. In another example, the prior hash value is a combination of the log entry hash values associated with the log entry records of the immediately previous log-entry batch. Log entry hash values may be combined using a commutative function such as addition, multiplication or a logical exclusive OR. In other examples, log entry hash values are combined by concatenating the log entry hash values and determining a cryptographic hash, cyclic redundancy code, or checksum of the concatenated log entry hash values. The initial log entry record 602 includes a previous prior hash 616.

When the first log entry record 604 is received by the logging service, the logging service determines a first log entry identifier 618 for the first log entry record 604 by incrementing the value of the initial log entry identifier 610. A first log entry hash 620 is determined by generating a cryptographic hash of the combination of a first entry data 622 with the initial log entry hash 614. Since the initial log entry record 602 is the last log entry record in the previous log-entry batch, the hash value of the previous log-entry batch is the initial log entry hash 614. In some examples, the hash value of the previous log-entry batch is a combination of the initial log entry hash 614 with other log entry hashes associated with other log entry records of the previous log-entry batch. The first prior hash 624 is set to the hash value of the previous log-entry batch.

When the second log entry record 606 is received by the logging service, the logging service determines a second log entry identifier 626 for the second log entry record 606 by incrementing the value of the first log entry identifier 618. A second log entry hash 628 is determined by generating a cryptographic hash of the combination of a second entry data 630 with the first log entry hash 620. The second prior hash 632 is set to the hash value of the previous log-entry batch. The hash value of the previous log-entry batch may be retrieved from the last log entry record of the previous log-entry batch or, alternatively, from the first prior hash 624.

When the third log entry record 608 is received by the logging service, the logging service determines a third log entry identifier 634 for the third log entry record 608 by incrementing the value of the second log entry identifier 626. A third log entry hash 636 is determined by generating a cryptographic hash of the combination of a third entry data 638 with the second log entry hash 628. The third prior hash 640 is set to the hash value of the previous log-entry batch. The hash value of the previous log-entry batch may be retrieved from the last log entry record of the previous log-entry batch or, alternatively, from the second prior hash 632.

After each batch of log entry records is received from a client by the logging service, the logging service may supply a checkpoint to the client. The checkpoint includes information that identifies the log entries in the batch, and a hash value for the batch. In some examples, the checkpoint includes hash values for each log entry record in the batch of log entry records and a prior hash value for the batch. In some examples, the log entries in the batch are identified using a range of identifiers. In another example, the log entries in the batch are identified using the list of identifiers.

Figure 7:
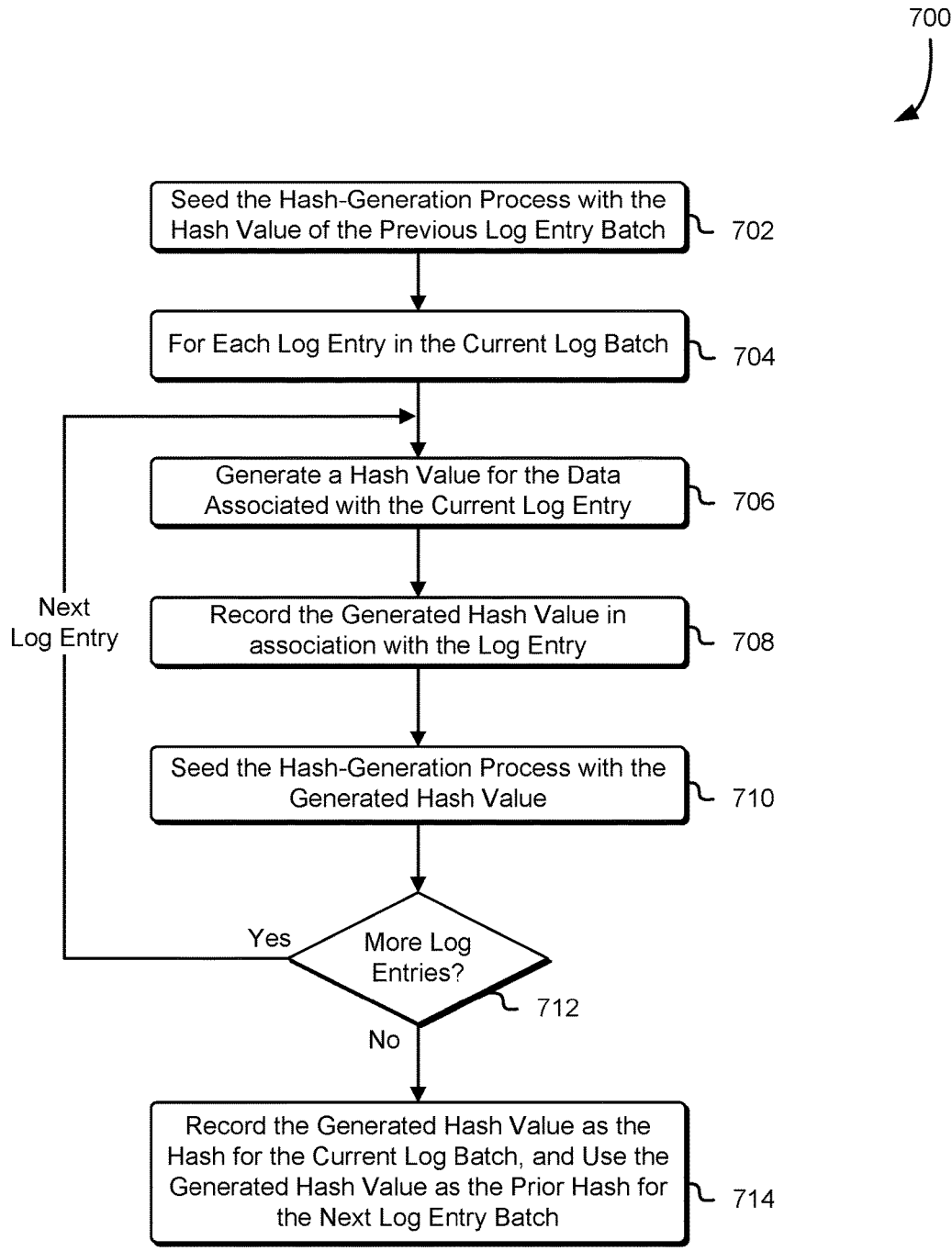
FIG. 7 shows an illustrative example of a process that, as a result of being performed by a logging service, generates hash values for each log entry in a batch of log entries.

FIG. 7 shows an illustrative example of a process that, as a result of being performed by a logging service, generates hash values for each log entry in a current batch of log entries. A flowchart 700 illustrates a process that begins at block 702 with a logging service seeding a hash-generation process. A seed value is generated based at least in part on information associated with a batch of log entries immediately preceding the current batch of log entries. In the example shown in FIG. 7, the seed value is the hash value of the previous batch of log entries. Seeding the hash-generation process may be accomplished in some implementations by using the seed value to initialize a cyclic redundancy code generator or cryptographic hash generator. In another implementation, seeding the hash-generation process may be accomplished by prepending or appending the seed value to data which is supplied to a hash generation module.

At block 704, the logging service initiates and iterative loop that iterates, in order, each log entry record in the current log batch. In each iteration, the logging service generates 706 a hash value for the iterated log entry record by processing the data associated with the iterated log entry record using the seeded hash-generation process. The resulting hash value is based at least in part on the data associated with the iterated log entry record and the seed value used to initialize the hash-generation process. The logging service records 708 the resulting hash value in association with the iterated log entry record in the log database. At block 710, the hash-generation process is reinitialized by seeding the hash-generation process with the resulting hash value of the currently iterated log entry record. If the logging service determines 712 that there are additional log entry records in the current log-entry batch, execution returns to block 706 and the next log entry record in the current log-entry batch is processed.

If there are not additional log entry records in the current log-entry batch, execution proceeds to block 714, and the logging service records the resulting hash value of the last iterated log entry record as the hash value for the current log-entry batch. The hash value of the current log-entry batch is used as the prior hash of the next log-entry batch.

Figure 8:
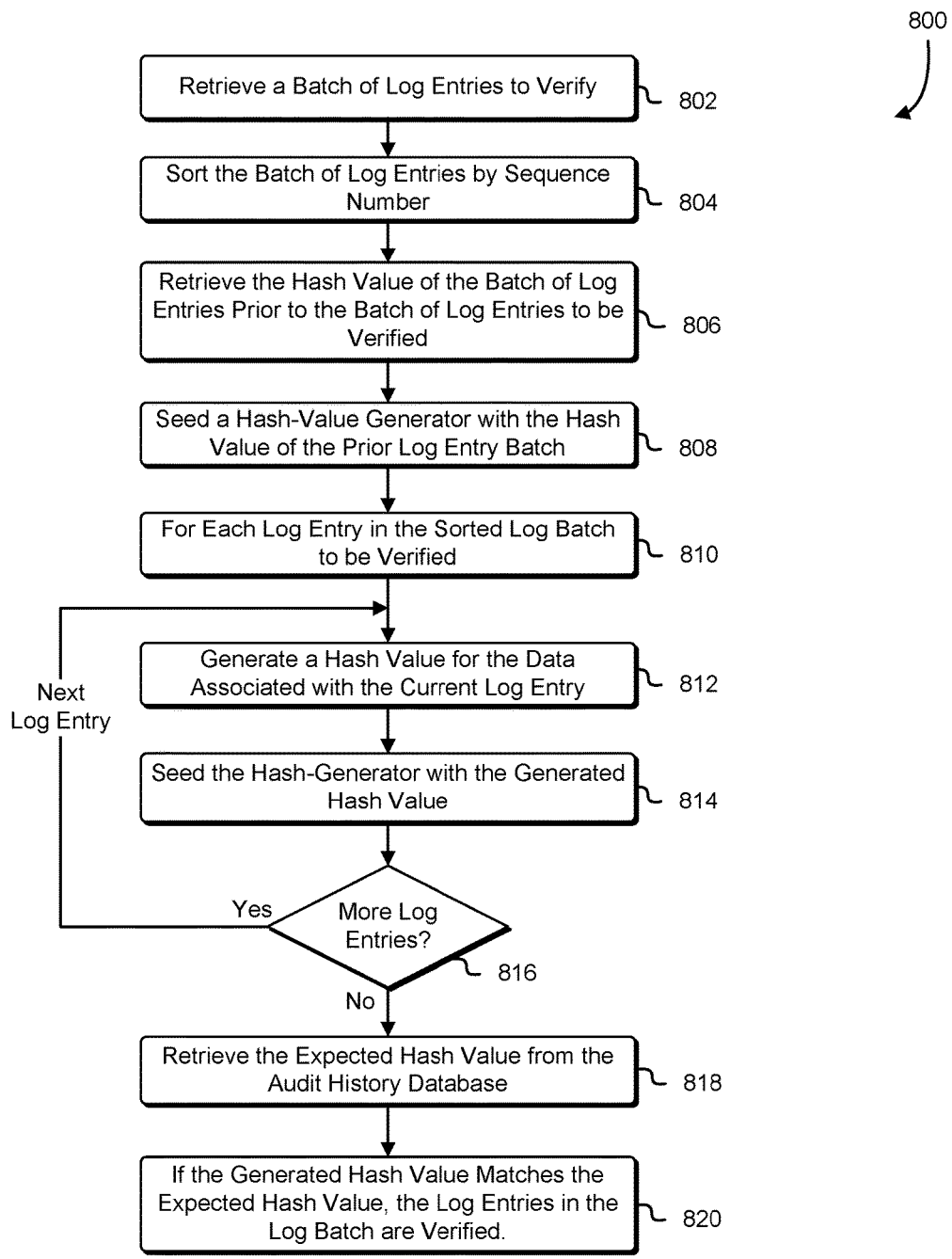
FIG. 8 shows an illustrative example of a process that, as a result of being performed by a client, verifies a batch of log entries previously provided to a logging service.

FIG. 8 shows an illustrative example of a process that, as a result of being performed by a client, verifies a batch of log entries previously provided to a logging service. A flowchart 800 illustrates a process that begins with a client selecting a batch of log entry records for verification. The client selects the batch of log entry records based at least in part on audit information maintained in an audit history database. The audit information includes information that identifies the log entry records in each batch and a hash value for each batch. In some examples, the audit information includes, for each batch of log entries, a hash value for the previous batch of log entries. The batch of log entry records is selected from the set of log-entry-record batches for which audit information is available. The client retrieves 802 log entry records that are associated with the batch of log entry records from the logging service. In some examples, the client retrieves the log entry records by providing a range of log entry identifiers for the log entry records. In another example, the client retrieves the log entry records by providing a set of log entry identifiers. In yet another example, the client retrieves the log entry records by providing a batch identifier for the batch of log entry records. To simplify later processing, the log entry records in the batch of log-entry records are sorted 804 in ascending order in accordance with the log entry identifiers associated with each log entry record. In some examples, the log entry records are not rearranged, and an ordered index is generated so that the log entry records may be iterated in ascending order of the log entry identifiers.

The client retrieves 806, from the audit history database, the hash value of the log-entry batch immediately preceding the batch of log entry records. In some examples, the audit information for the batch of log entry records includes the hash value of the previous log-entry batch. In another example, the hash value of the previous log-entry batch is provided by the logging service. In yet another example, the hash value of the previous log-entry batch is retrieved by the client from the audit history database by retrieving the audit information of the previous log-entry batch. The hash value of the prior log-entry batch is used as a seed value to seed 808 a hash generator. In some examples, the seed value is used to initialize a cyclic redundancy code generator. In another example, the seed value is used to initialize a cryptographic hash generator. In yet another example the seed value is prepended to data which is provided to a hash generator.

At block 810, the client initiates a loop that iterates over each log entry record in the batch of log entry records. The log entry records are iterated in an order determined by the log entry identifiers, and in the same order that the log entry records were originally processed by the logging service. As each log entry record is iterated, the client generates 812, using the seeded hash generator, a hash value using the data of the iterated log entry record. At block 814, the hash value is used to reinitialize the seed value of the hash generator. At decision block 816, the client determines whether there are additional log entry records to be processed. If there are additional log entry records to be processed, execution returns to block 812 and the next log entry record is processed. If there are not additional log entry records to reprocessed, execution advances to block 818.

At block 818, the client retrieves the expected hash value for the batch of log entry records from the audit history database. The client compares 820 the expected hash value to the hash value generated for the last log entry record in the batch of log entry records. If the hash values match, the client determines that the batch of log entry records has not been modified or altered. If the hash values do not match, the client determines that the content of the batch of log entry records has been modified after the batch of log entry records was originally submitted to the logging service.

Figure 9:
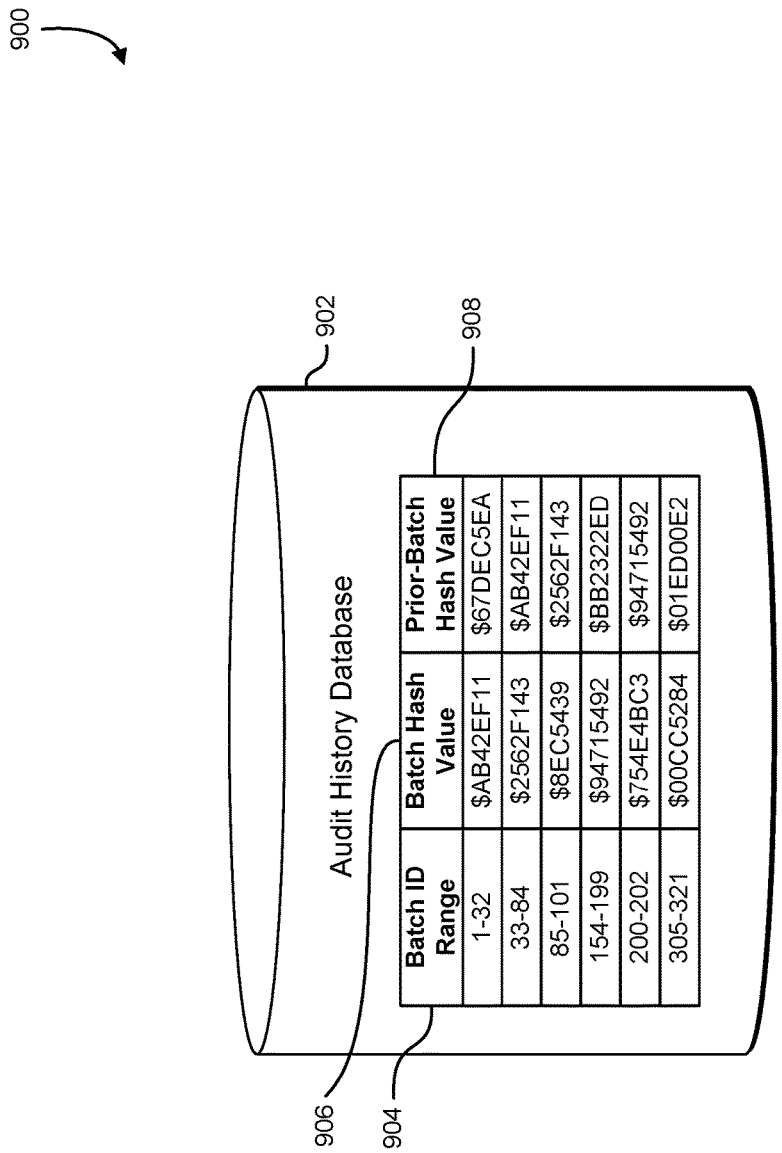
FIG. 9 shows an illustrative example of audit information contained within an audit history database maintained by a client.

FIG. 9 shows an illustrative example of audit information contained within an audit history database maintained by a client. A diagram 900 shows an audit history database 902 that holds audit information for a client of the logging service. The client is able to use the audit information to verify that log entries maintained by the logging service are not changed or corrupted while being maintained by the logging service.

The audit information comprises a table having three data columns and a row for each verifiable batch of log entries. A first data column 904 holds information that specifies a numerical range of log-entry identifiers. A batch of log entry records maintained by the logging service is associated with each specified range of log-entry identifiers. A second data column 906 holds a hash value for each batch of log entry records. The hash value is returned by the logging service to the client when the batch of log entry records is first provided to the logging service by the client, and the client stores the hash value in the second data column 906. In some examples, a third data column 908 holds, for each batch of log entry records, a hash value associated with the prior batch of log entry records. In various examples, maintaining a prior-batch hash value in the audit history database 902 allows the client to remove some rows from the data table while maintaining sufficient information to verify the log-entry batch is associated with the remaining rows.

Figure 10:
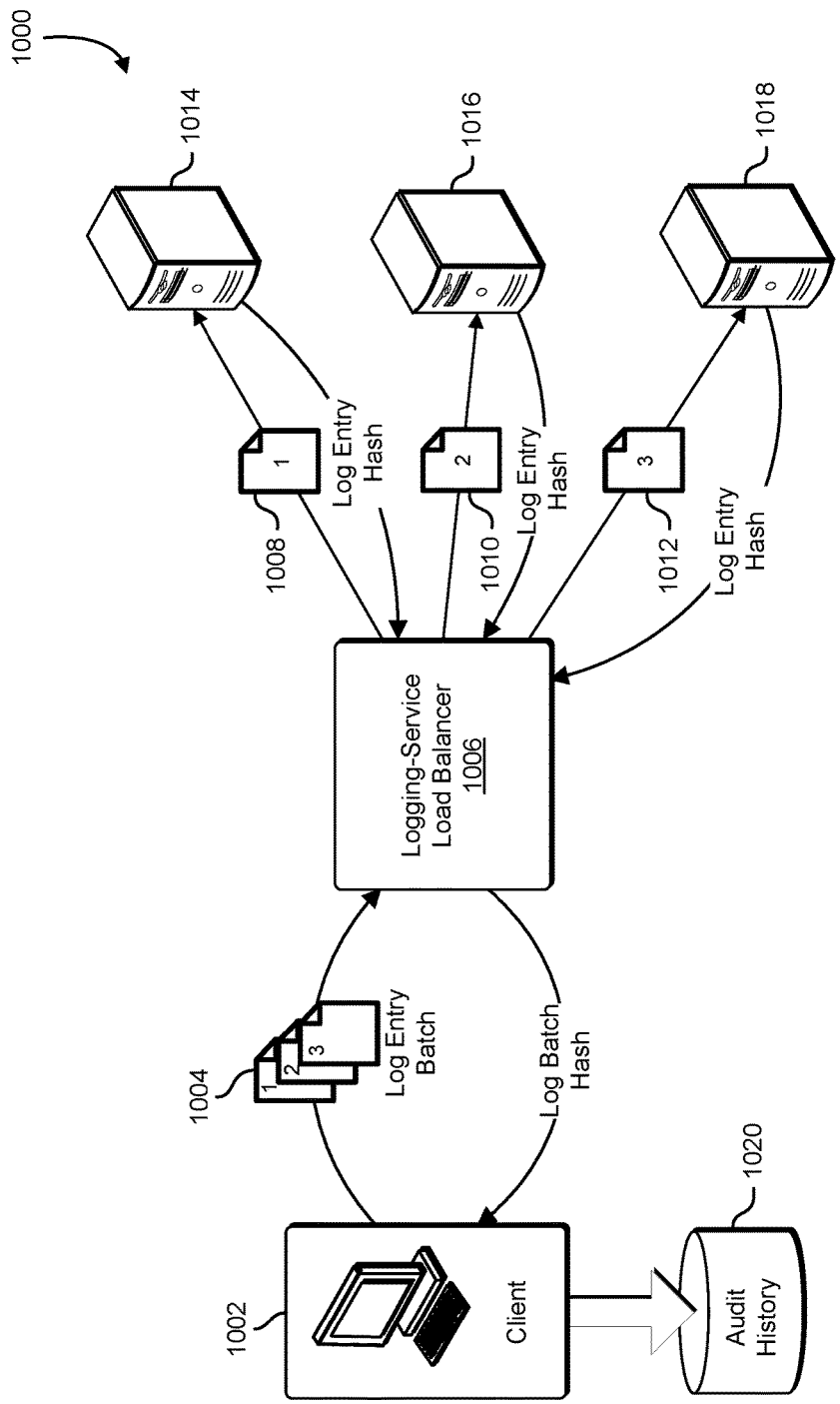
FIG. 10 shows an illustrative example of a client that submits a batch of log entries to a distributed logging service.

FIG. 10 shows an illustrative example of a client that submits a batch of log entries to a distributed logging service. A system diagram 1000 shows a client computer system 1002 that submits a log-entry batch 1004 to a distributed logging service via a logging-service load balancer 1006. The logging-service load balancer 1006 separates the log-entry batch into three log entry records; a first log entry record 1008, a second log entry record 1010, and a third log entry record 1012. The first log entry record 1008 is submitted to a first logging server 1014. The second log entry record 1010 is submitted to a second logging server 1016. The third log entry record 1012 is submitted to a third logging server 1018. Identifiers for the log entry records of the log batch may be assigned by the logging-service load balancer 1006 or by the logging servers 1014, 1016, and 1018. Each logging server returns log entry hashes corresponding to the log entry records provided by the logging-service load balancer 1006. The logging-service load balancer 1006 combines the log entry hashes into a single hash value for the log batch, and returns the single hash value to the client computer system 1002. The logging-service load balancer 1006 returns, to the client computer system 1002, information that identifies the log batch. In some examples, information that identifies the log batch is a set of identifiers. In another example, the information that identifies the log batch is a range of identifiers. In yet another example, the information that identifies the log batch is a batch ID assigned by the logging-service load balancer. The information identifying the log batch and the hash value for the log batch are retained in an audit history database 1020 by the client computer system 1002.

The client computer system 1002 verifies a batch of log entries by retrieving the log entries from the logging service, recalculating the hash value based at least in part on the received log entries, and comparing the recalculated hash value to the stored hash value in the audit history database 1020. If a commutative function is used to combine the hash values of the individual log entry records at the logging-service load balancer 1006, the corresponding log entry hash values may be combined in any order by the logging-service load balancer 1006, potentially improving performance of the logging system.

Figure 11:
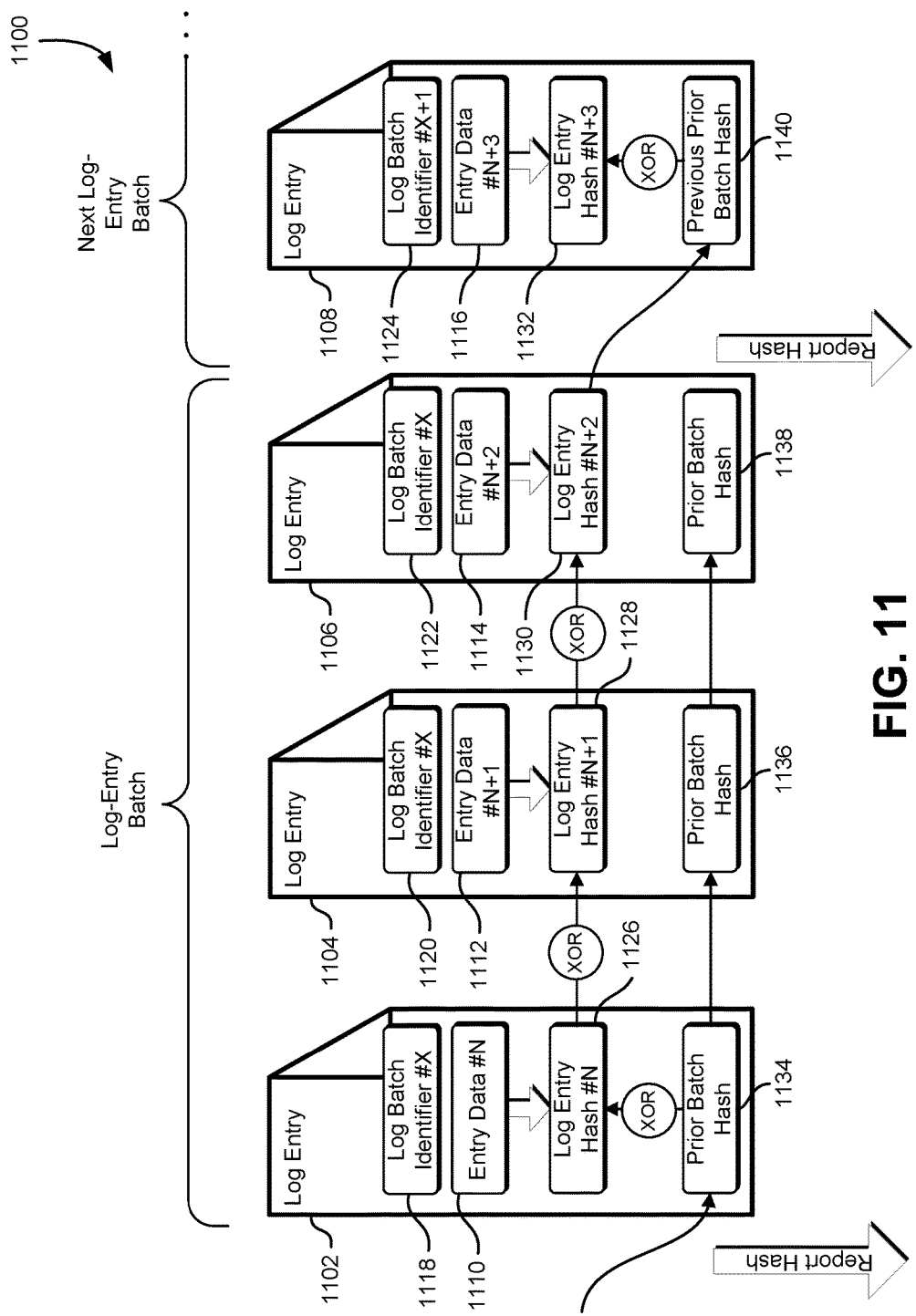
FIG. 11 shows an illustrative example of a log-entry-batch structure used by a distributed logging service that allows a client to verify the integrity of a log batch by examining the log entries in various orders.

FIG. 11 shows an illustrative example of a log-entry-batch structure used by a distributed logging service that allows a client to verify the integrity of a log batch by examining the log entries in various orders. A diagram 1100 shows log entries associated with the current log-entry batch and log entries associated with a next log-entry batch. A first log entry 1102, a second log entry 1104, and a third log entry 1106 are associated with the first log-entry batch. A next log entry 1108 is associated with the next log-entry batch. Each log entry record contains log data, a log batch identifier, a log entry hash, and a prior batch hash. The log data is the data provided by the client computer system to the logging service. The log batch identifier is an identifier assigned to the log batch by a logging-service load balancer. The log entry hash is the hash value of the data associated with the particular log entry, and the prior batch hash is the batch hash of the immediately previous log-entry batch.

The first log entry 1102 includes a first log data 1110. The second log entry 1104 includes a second log data 1112. The third log entry 1106 includes a third log data 1114. The next log entry 1108 includes a next log data 1116. The first log entry 1102, the second log entry 1104, and the third log entry 1106, each include a copy of an identifier associated with the current log batch 1118, 1120, and 1122. The next log entry 1108 includes a log batch identifier of the next log-entry batch 1124.

The log entry hash of each log entry is determined by generating a cryptographic hash of the log data associated with the entry. Examples of cryptographic hash functions include SHA-256, SHA-384, SHA-512, MD5, and Whirlpool. A first log entry hash 1126 is generated by determining a cryptographic hash of the first log data 1110. A second log entry hash 1128 is generated by determining a cryptographic hash of the second log data 1112, and a third log entry hash 1130 is generated by determining a cryptographic hash of the third log data 1114. The hash value of the current log-entry batch is created by combining the hash values associated with each log entry record with an exclusive OR operation, and combining the results with the hash value of the immediately previous log-entry batch. In the example shown in FIG. 11, the first log entry hash 1126, the second log entry hash 1128, the third log entry hash 1130, and the prior batch hash 1134 (or 1136 or 1138) are combined with an exclusive OR operation to produce the hash value for the current log-entry batch. The hash value of the current log-entry batch is written as the prior batch hash of the next log-entry batch 1140.

Figure 12:
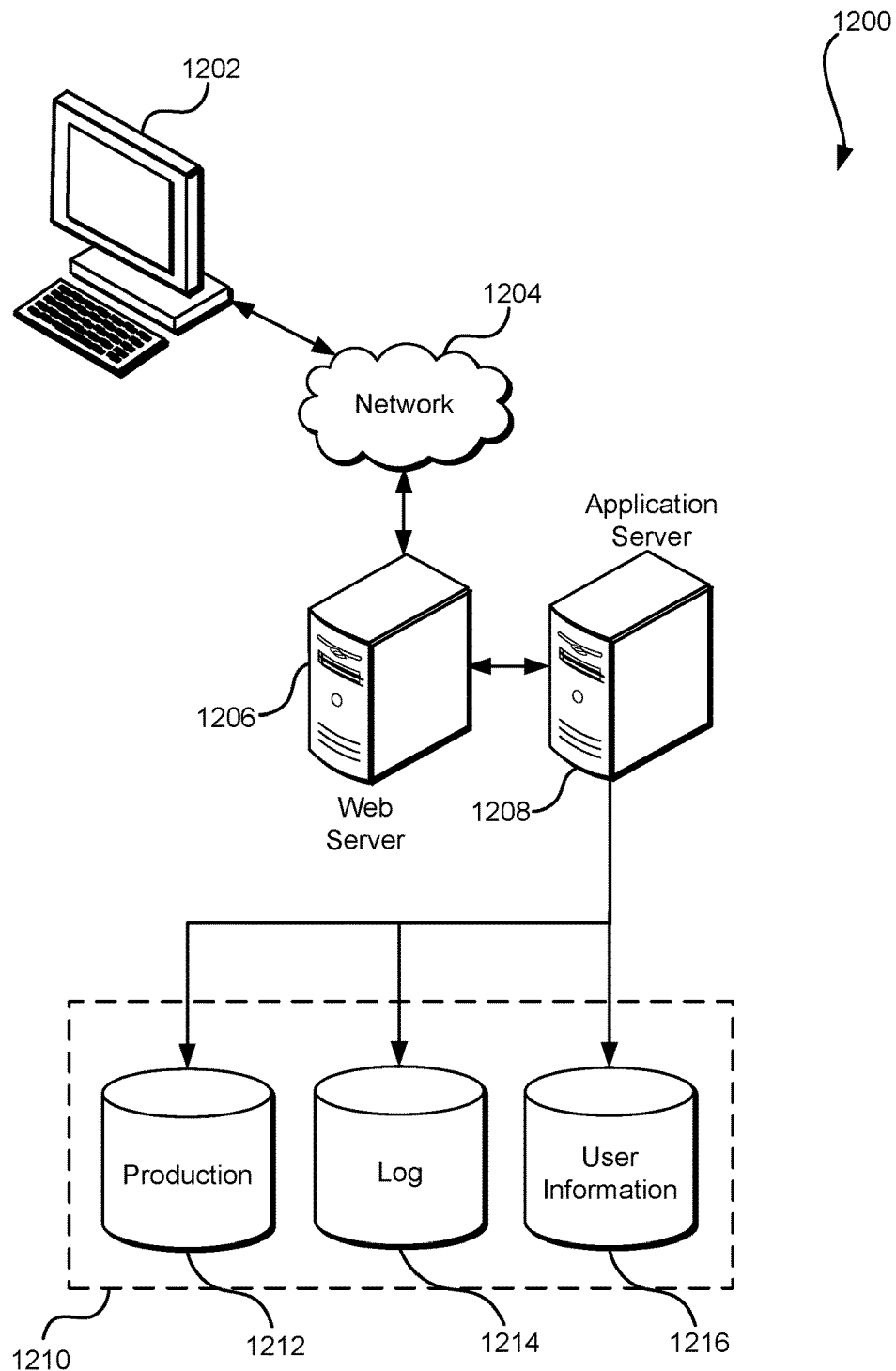
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes, and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. The application server 1208 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including, without limitation, those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based at least in part on the disclosure and teachings provided herein, a person of ordinary skill in the art will appreciate other ways and/or methods to implement the various embodiments.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

In various embodiments, data objects such as log entries with associated hash values may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following descriptions, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   under control of one or more computer systems configured with executable instructions,
   receiving, at a logging service, a batch of log entries from a client, wherein the batch of log entries are ordered log entries;
   determining a range of log-entry identifiers for the batch of log entries;
   determining a hash value for the batch of log entries, the hash value based at least in part on a prior-log-batch hash value associated with another batch of log entries previously received, the hash value for the batch of log entries determined by at least:
  determining an integrity indicator for a log entry in the batch of log entries based at least in part on a log entry and an integrity indicator of a previous log entry in the batch of log entries; and
providing the hash value and the range of log-entry identifiers to the client;
storing the batch of log entries in association with the range of log-entry identifiers and the hash value;
receiving, from the client, a request for the batch of log entries, the request including the range of log-entry identifiers;
sending the batch of log entries to the client;
causing the client to determine a current hash value for the batch of log entries, the current hash value based at least in part on the prior-log-batch hash value; and
whereby the client is able to confirm integrity of the batch of log entries by determining that the current hash value matches an expected hash value.

2. The computer-implemented method of claim 1, further comprising:
  as a result of the client selecting, from an audit history database maintained by the client, audit information associated with the batch of log entries, the audit information including the range of log-entry identifiers, an expected log-batch hash value, and the prior-log-batch hash value,
  providing, to the client, the prior-log-batch hash value.

3. The computer-implemented method of claim 1, wherein the logging service is unable to predict the batch of log entries selected by the client from a collection of log-entry batches retained by the logging service.

4. The computer-implemented method of claim 1, further comprising, as a result of providing the hash value to the client, receiving an indication from the client that the batch of log entries does not match an original batch of log entries provided by the client.

5. A system, comprising:
  at least one computing device that implements a logging service, wherein the logging service:
  receives, from a client, a sequence of log-entry batches, the sequence of log-entry batches being comprised of ordered log-entry records;
  stores the sequence of log-entry batches;
  generates an integrity indicator for a particular log-entry batch in the sequence of log-entry batches by at least:
  determining an integrity indicator for a log-entry record in the particular log-entry batch based at least in part on a log-entry record and an integrity indicator of a previous log-entry record in the particular log-entry batch; and
  provides audit information to the client, the audit information including the integrity indicator for the particular log-entry batch, and the audit information including information that identifies a set of log-entry records associated with the particular log-entry batch.

6. The system of claim 5, wherein the logging service further:
  establishes an ordering for the log-entry records by at least assigning a comparable identifier to each log-entry record in the sequence of log-entry batches; and
  wherein the information that identifies the set of log-entry records associated with the particular log-entry batch comprises the identifiers associated with the particular log-entry batch.

7. The system of claim 5, wherein the integrity indicator for the particular log-entry batch is based at least in part on a cryptographic hash of the log-entry records associated with the particular log-entry batch and the integrity indicator of the previous log-entry batch.

8. The system of claim 5, wherein the logging service further generates an initial integrity indicator for an initial log-entry batch in the sequence of log-entry batches, the initial integrity indicator based at least in part on log-entry records associated with the initial log-entry batch, and an initial seed value accessible to the client.

9. The system of claim 5, wherein the integrity indicator for the particular log-entry batch in the sequence of log-entry batches is generated by at least:
  determining an integrity indicator for each of the log-entry records associated with the particular log-entry batch to produce a set of integrity indicators; and
  combining the set of integrity indicators into a single integrity indicator using a commutative function.

10. The system of claim 9, wherein the set of integrity indicators is combined using a logical exclusive OR function, an addition function, or a multiplication function.

11. The system of claim 5, wherein the logging service further:
  receives a verification request from the client, the verification request identifying a suspect log-entry batch; and
  in response to the verification request, provides, to the client, the log-entry records associated with the suspect log-entry batch.

12. A non-transitory computer-readable storage medium having stored thereon 2 executable instructions that, as a result of being executed by one or more processors of a computer system, cause the computer system to at least:
  receive a first batch of log entries from a client, the first batch comprising a first sequence of log-entry records;
  store the first sequence of log-entry records;
  provide, to the client, a first integrity indicator associated with the first batch of log entries and a first range of identifiers assigned to the first batch of log entries by a logging service;
  receive a second batch of log entries from the client, the second batch comprising a second sequence of log-entry records;
  store the second sequence of log-entry records;
  determine a second integrity indicator by at least generating a log-entry integrity indicator for a log-entry record in the second sequence of log-entry records, the log-entry integrity indicator of the log-entry record based at least in part on a log-entry integrity indicator of a previous log-entry record in the second sequence and the first integrity indicator; and
  provide, to the client, the second integrity indicator and a second range of identifiers assigned to the second batch of log entries by the logging service.

13. The non-transitory computer-readable storage medium of claim 12, wherein the instructions further comprise instructions that, as a result of being executed by the one or more processors, cause the computer system to:
  store the first integrity indicator in a log database in association with the first batch of log entries; and
  store the second integrity indicator in the log database in associate with the second batch of log entries.

14. The non-transitory computer-readable storage medium of claim 12, wherein the instructions further comprise instructions that, as a result of being executed by the one or more processors, cause the computer system to store the first integrity indicator in association with each log-entry record in the second sequence of log-entry records.

15. The non-transitory computer-readable storage medium of claim 12, wherein the instructions further comprise instructions that, as a result of being executed by the one or more processors, cause the computer system to:
   receive, from the client, a request for the second batch of log entries;
   provide, in response to the request, the second batch of log entries and the first integrity indicator; and
   whereby the client is able to determine an expected integrity indicator for the second batch of log entries based at least in part on the first integrity indicator and the second batch of log entries.

16. The non-transitory computer-readable storage medium of claim 12, wherein the instructions, as a result of being executed by the one or more processors, further cause the computer system to:
   distribute individual log entries from the first batch of log entries to a plurality of logging servers;
   receive individual integrity values for the individual log entries from the plurality of logging servers; and
   combine the individual integrity values into an integrity value for the first batch of log entries.

17. The non-transitory computer-readable storage medium of claim 12, wherein at least one integrity indicator of at least one log-entry record is determined using a checksum.

18. The non-transitory computer-readable storage medium of claim 12, wherein at least one integrity indicator of at least one log-entry record is determined using a cryptographic hash function selected from one of SHA-256, SHA-384, SHA-512, MD5, and Whirlpool.

* * * * *